(12) United States Patent  (10) Patent No.: US 6,712,334 B2
Motonaka et al.  (45) Date of Patent: Mar. 30, 2004

(54) EXHAUST VALVE FOR A BAG

(75) Inventors: Hiroshi Motonaka, Gobo (JP); Yoshio Shiozaki, Gobo (JP)

(73) Assignee: Taiyo Kagaku Kabushiki Kaisha, Wakayama-ken (JP)

( * ) Notice: Subject to any disclaimer, the term of this patent is extended or adjusted under 35 U.S.C. 154(b) by 41 days.

(21) Appl. No.: 10/198,748

(22) Filed: Jul. 19, 2002

(65) Prior Publication Data

US 2003/0047700 A1 Mar. 13, 2003

(30) Foreign Application Priority Data

Jul. 24, 2001 (JP) ........................................ 2001-223239

(51) Int. Cl.[7] .............................................. F16K 51/00
(52) U.S. Cl. ................. 251/149.6; 206/524.8; 383/103
(58) Field of Search ........................... 251/149.6, 149.1; 206/524.8; 383/103

(56) References Cited

U.S. PATENT DOCUMENTS

| 5,332,095 | A | * | 7/1994 | Wu ........................... 206/524.8 |
| 5,480,030 | A | * | 1/1996 | Sweeney et al. ............. 383/103 |
| 5,651,470 | A | * | 7/1997 | Wu ........................... 206/524.8 |
| 5,941,391 | A | * | 8/1999 | Jury ......................... 206/524.8 |
| 6,581,641 | B2 | * | 6/2003 | Skeens et al. ........... 251/149.1 |

* cited by examiner

*Primary Examiner*—John Bastianelli
(74) *Attorney, Agent, or Firm*—Ronald E. Greigg

(57) ABSTRACT

A movable lid is mounted to a valve body movably in an up-and down direction toward and away from the valve body whereby the valve body is lowered to be open against force of a spring by pressing a suction nozzle of an electric vacuum cleaner onto the movable lid and at the same time an exhaust of a bag may be carried out. After the exhaust, by moving the suction nozzle away from the movable lid, the movable lid may be moved upwards to place its original position the restoring force of the spring, so that the valve body may be opened.

18 Claims, 9 Drawing Sheets

閉
開

EXHAUST VALVE FOR A BAG

BACKGROUND OF THE INVENTION

1. Field of the Invention

The present invention relates to an exhaust valve which is mounted to a bag for keeping bedding such as blankets, comforters or the like, or clothes, and is used to deaerate the bag by using a suction nozzle of an electric vacuum cleaner or the like to compress contents of the bag to make the same compact.

2. Description of the Prior Art

Conventionally, when a comforter, clothes or the like are stored in a closet or a chest, after being placed in a bag which is flat and is made of synthetic resin, the contents have been compressed by removing the air in the bag by using a vacuum device such as an electric vacuum cleaner in order to accommodate as many comforters, clothes or the like as possible in a limited closet space. Compression of the contents of the bag as mentioned above has been done not only in general homes but also by traders and manufacturers engaged in bedding. Further, compression of such bags has been done when a traveler put clothes and so forth in a suitcase.

In general, in order to compress the bag containing a comforter or the like, part of an open portion of the bag is opened by a fastener, which is provided at the open portion of the bag, through which a suction nozzle of an electric vacuum cleaner is inserted to have the bag deaerated. However, when the suction nozzle is inserted directly into the bag, the contents of the bag are sucked into an open end of the nozzle by a force of suction of the suction nozzle, which may not only cause damage to the contents but also stops up the suction nozzle, which further makes deaeration of the bag difficult, and may cause a failure of the electric vacuum cleaner because of a heavy load applied on a motor of the electric vacuum cleaner.

Therefore, the exhaust valve is mounted to the bag, through which the air in the bag is exhausted by the suction nozzle of the electric vacuum cleaner from outside to compress the bag, without inserting the suction nozzle of the electric vacuum cleaner into the bag.

The exhaust valve as mentioned above comprises a valve body and a cylindrical member. The valve body is mounted to a proper location of one side of the bag, and an exhaust opening portion, which is provided at a center part of the valve body, goes through into the bag. The cylindrical member is screwed to a threaded cylinder, which is provided to project at a center part of an upper surface of the valve body. The cylindrical member is provided with a valve plate to be integrated, which works to open and close the above-mentioned exhaust opening portion. The exhaust opening portion is opened by having the cylindrical member turned to have the valve plate distanced from the above-mentioned exhaust opening portion, and after a suction opening portion of the suction nozzle of the electric vacuum cleaner is fit to the cylindrical member, the air in the bag is suctioned and removed through the exhaust opening portion.

However, according to the exhaust valve structure as mentioned above, as suction of the air through the suction nozzle works only in the bag intensively, the vacuum (deaeration) continuous to be applied to the bag even after the bag is completely deaerated. Consequently, as in the above-mentioned case, a heavy load is applied on the motor of the electric vacuum cleaner, which causes a failure of the same. In addition, after the deaeration, the cylindrical member have to be turned to a direction of closure, it may happen that the air comes into the bag from outside through the exhaust opening portion during the turning operation. Consequently, there are such problems that the bag swells, and that it is difficult for elderly persons to handle the bag.

Further, in case the diameter of the suction nozzle of the vacuum cleaner is different, it may happen that the suction nozzle can not fit to the cylindrical member, and suction and deaeration of the air in the bag can not be effectively carried out. Furthermore, when deaerated bags are piled one on the other, a corner of opening end of the cylindrical member or the like dips into a lower surface of a bag placed thereon and it is possible that contents of the bag may be damaged. Still further, when the cylindrical member unexpectedly turns in a direction, allowing the exhaust opening to partially open, there is a problem that the air comes into the bag from outside and the bag swells.

Moreover, the valve body is mounted to a proper location of one side of the bag by having the lower surface of the valve body adhered to the bag to be integrated by means of welding or the like so that the opening portion provided in the bag and the exhaust opening portion of the valve body can be communicated. Therefore, not only a mounting operation of the valve to the bag is complicated and requires time and effort but also it is possible that the air may come into the bag from outside after the deaeration is finished, in case adhesion of the valve body to the bag becomes deteriorated.

SUMMARY AND ADVANTAGES OF THE INVENTION

The present invention has been made in view of the above-mentioned problems. An object of the invention is to provide an exhaust valve structure, in which a valve is automatically opened only by pressing a suction nozzle of an electric vacuum cleaner, whereby a bag can be deaerated without applying a heavy load on the electric vacuum cleaner, the valve is automatically closed upon releasing a pressing force of the suction nozzle after the deaeration is finished, a state of the closure of the valve can be locked, the exhaust valve can be used for deaeration of the bag irrespective of a diameter of the suction nozzle, and a mounting of the valve to the bag can be done easily and without fail.

In order to achieve the above-mentioned object, the exhaust valve of the bag according to this invention comprises a valve body provided with an exhaust opening portion at a center of the lower part thereof to be communicated with a bag, a movable lid provided with an air intake going through from an upper surface to a lower surface thereof; said movable lid being mounted on the valve body movably in up-and-down directions, a valve plate for open and close of the exhaust opening portion, spring means for pressing the valve plate from the up position to fit the exhaust opening portion closely, and a valve plate operational mechanism for opening the valve plate by moving the valve plate upwards against a spring force of the spring means; said valve plate, spring means and valve plate operational mechanism being arranged in a chamber formed between the opposite surfaces of the movable lid and the valve body, wherein the valve plate operational mechanism is operated by pressing the movable lid down so as to open the valve plate and the air in the bag is exhausted from the air intake.

In the exhaust valve as structured above, the invention according to one embodiment has a structure wherein a plurality of leg members of a spring holder, which is arranged above the exhaust opening portion, are fixed on the upper surface of the valve body around a periphery of the exhaust opening portion and the spring means is held between the spring holder and the valve plate and each of opening portions between the adjacent leg members of the spring holder is communicated with the air intake of the movable lid.

Further, the invention may include a structure of the valve plate operational mechanism wherein the valve operating mechanism comprises a plurality of lever members which are integrated with the outer periphery of the valve plate at the inner ends of the lever members that the lever members radially project outwardly between each of the leg members of the spring holder, with fulcrum members projecting from the upper surface of the valve plate to receive the under surfaces of the middle of the length of the lever members in longitudinal direction thereof, and pressing projecting strips each projecting downwardly towards the under surface of the periphery of the movable lid so as to press the outer portion of the upper surface of the lever member which portion is located outside the fulcrum members.

Furthermore, the invention may comprise projecting guide members projecting at a periphery of the upper surface of the valve plate, and arc-shaped openings formed with the movable lid to face the projecting guide members so as to move the projecting guide members relative to the movable lid with rotation of the movable lid in the direction of the periphery thereof; an end portion of each of the arc-shaped openings being formed to be an opening for inserting the projecting guide members to be movable in an up-and-down direction therein and the other end being formed to be an opening having a stopper for stopping the downward movement of the movable lid by receiving the upper end surface of the projecting guide member.

The invention may include a structure wherein the valve body comprises an upper half part and a lower half part which are separably connected to one another so as to attach the valve body to the bag by holding a part of the bag from the outer and inner surfaces thereof, and the lower half part provides the exhaust opening portion at a center of the lower part, which opening portion is communicated with a small opening portion of the bag from the inside surface thereof, and the upper half part provides an opening portion for valve arrangement at a center of the upper half part so as to press and contact a packing, which is mounted to a lower peripheral part of the valve plate, with the upper surface of the periphery of the small opening portion of the bag. The movable lid may be formed to be domed-shape.

The invention, in one embodiment, has a structure wherein the movable lid is provided with a surrounding wall integrally and downwardly at a peripheral portion of a disc portion whose upper surface is flat, said disc portion having an air intake at a center thereof, and a sponge body having a predetermined thickness is laid around the air intake so as to enable pressing of an opening end of a suction nozzle against the sponge body.

In a further modification, the invention comprises a ring-shaped supporting frame provided with the lower half portion of the valve body, said frame having a plurality of small opening portion penetrating the upper and lower surfaces of the valve body.

As mentioned above, the exhaust valve for the bag according to the present invention comprises a valve body provided with an exhaust opening portion at a center of the lower part thereof to be communicated with a bag, a movable lid provided with an air intake going through from an upper surface to a lower surface thereof; said movable lid being mounted on the valve body movably in the up-and-down direction, a valve plate for opening and closing the exhaust opening portion, spring means for pressing the valve plate from the up to fit the exhaust opening portion closely, and a valve plate operating mechanism for opening the valve plate by moving the valve plate upwards against a spring force of the spring means; said valve plate, spring means and valve plate operating mechanism being arranged in a chamber formed between the opposed surfaces of the movable lid and the valve body, wherein the valve plate operational mechanism is operated by pressing the movable lid down so as to open the valve plate and the air in the bag is exhausted from the air intake.

Therefore, by pressing a suction nozzle of an electric vacuum cleaner against an upper surface of the movable lid to move the movable lid down toward a valve body, a valve plate can easily and automatically open via a valve plate operating mechanism and deaeration of a bag can be carried out immediately. After the deaeration, a valve can automatically close by a restoring force of a spring by releasing a pressing force of the suction nozzle against the movable lid without operating the movable lid.

Therefore, not only is the operation very easy whereby even elderly persons can carry out deaeration easily, but also the valve can be closed upon removing a suction nozzle of an electric vacuum cleaner from the movable lid in a way just like a remote control, wherefore the outside air is reliably prevented from reentering the bag after the deaeration, and the bag can be compressed to the extent possible, and furthermore handling quality and storage quality improve.

Further, the invention has structures wherein the spring is arranged in a state of compression between the valve body and the spring holder which is arranged above the exhaust opening portion, and wherein the valve plate operating mechanism comprises a plurality of lever members which are integrated with the outer periphery of the valve plate at the inner ends of the lever members so that the lever members radially project outwardly between each of the leg members of the spring holder, with fulcrum members projecting from the upper surface of the valve plate to engage the under surfaces of the middle of the length of the lever members in longitudinal direction thereof, and pressing projecting strips each projecting downwardly towards the under surface of the periphery of the movable lid so as to press the outer portion of the upper surface of the lever member which portion is located outside the fulcrum members. Therefore, at the time of deaeration of the bag, when the suction nozzle of the electric vacuum cleaner is pressed against the movable lid in order to move the movable lid down as mentioned above, the valve plate is moved up against the spring force to open the valve easily and without fail while the lever member is pivoted on the fulcrum in an up-and-down direction, and the air in the bag can be smoothly exhausted from the exhaust opening portion to the suction nozzle through the gap between the adjacent legs of the spring holder and the air intake.

Further, when the force of pressing down of the suction nozzle is released, the valve plate is immediately moved down by the restoring force of the spring and the exhaust opening portion is closed. And at the same time, the lever member is moved so that the surface of the outer end of the lever member returns to the original position together with the movable lid while keeping in contact with the pressing projecting strip of the movable lid.

According to one variant of the invention, the projecting guide members projecting at a periphery of the upper surface of the valve plate for receiving the outer end portion of each of the lever members and the arc-shaped openings formed with the movable lid to face the projecting guide members so as to move the projecting guide members relative to the movable lid with rotation of the movable lid in the direction of the periphery thereof; an end portion of each of the arc-shaped openings being formed to be an opening for inserting the projecting guide members to be movable in an up-and-down direction therein and the other end being formed to be an opening having a stopper for stopping the downward movement of the movable lid by receiving the upper end surface of the projecting guide member. Therefore, at the time of deaeration of the bag, the movable lid can be smoothly moved down along the projecting guide portions, and after the deaeration, when the movable lid is turned in a horizontal direction, the projecting guide portions are comparatively moved to the other part of the arc-shaped opening portions so that the upper surface thereof can face or come into contact with the lower surface the stoppers, and the movable lid can be locked in the position whereby the valve plate can not be unexpectedly opened.

Further, during the deaeration of the bag, the suction force of the suction nozzle also works on the arc-shaped opening portions of the movable lid via the vacuum-exhaust chamber of the valve body and the outside air can be sucked through the arc-shaped opening portion to the suction nozzle via the vacuum-exhaust chamber and the air intake. Therefore, after the bag is completely deaerated, the outside air can continue to be sucked through the arc-shaped opening portions, and the bag can be deaerated without applying excessive load on a motor of the electric vacuum cleaner.

Furthermore, since the valve body comprises an upper half part and a lower half part, between which a proper part of one side of the bag is held from back and front or in other words inside and outside thereof, the valve body can be mounted to the bag easily and firmly only by coupling the upper half part to the lower half part from outside of the bag, which lower half part is placed on a inner surface of the bag in a state that an exhaust opening portion provided at a center of the lower half part is fit to a small opening portion provided in the bag. In addition, a packing mounted to the lower surface of the valve plate is structured so as to come into contact with a part surrounding the small opening portion of the bag under pressure through an opening portion for valve arrangement provided in the center of the upper half part, whereby leak of the air and invasion of the outside air are prevented.

According to the invention since the upper surface of the movable lid is formed to be a dome-shape, even if deaerated bags are piled one on the other, there is no concern that the bag placed on the other will be damaged by a scratch of the movable lid. In addition, even if a diameter of the suction nozzle of the electric vacuum cleaner is different, an opening end of the suction nozzle can come into contact with the upper surface of the movable lid easily and without fail, and deaeration of the bag can be carried out easily and efficiently.

According to one embodiment, the movable lid comprises a disc portion whose upper surface is flat, a surrounding wall which is provided downwardly to be integrated with a periphery of the disc portion, an air intake which is provided in the center of the disc portion, and a sponge body with a predetermined thickness which is laid on a part surrounding the air intake. Therefore, deaeration can be carried out by pressing a suction nozzle with any shape and any caliber against the sponge body, and it can be prevented that a heavy load is applied to a motor of an electric vacuum cleaner as the outside air is sucked through the sponge body.

According to another embodiment, the invention further comprises a ring-shaped supporting frame provided with the lower half portion of the valve body, said frame having a plurality of small opening portion penetrating the upper and lower surfaces of the valve body. Therefore, by providing a ring-shaped supporting frame, having a plurality of small openings going from an upper surface through a lower surface thereof, to be integrated with the lower half part of the valve body, the contents of the bag can be compressed smoothly while preventing filling material such as feathers from moving intensively to the exhaust opening portion.

BRIEF DESCRIPTION OF THE DRAWINGS

The drawings show preferred embodiments in which.

DETAILED DESCRIPTION OF THE PREFERRED EMBODIMENTS

Figure 1:
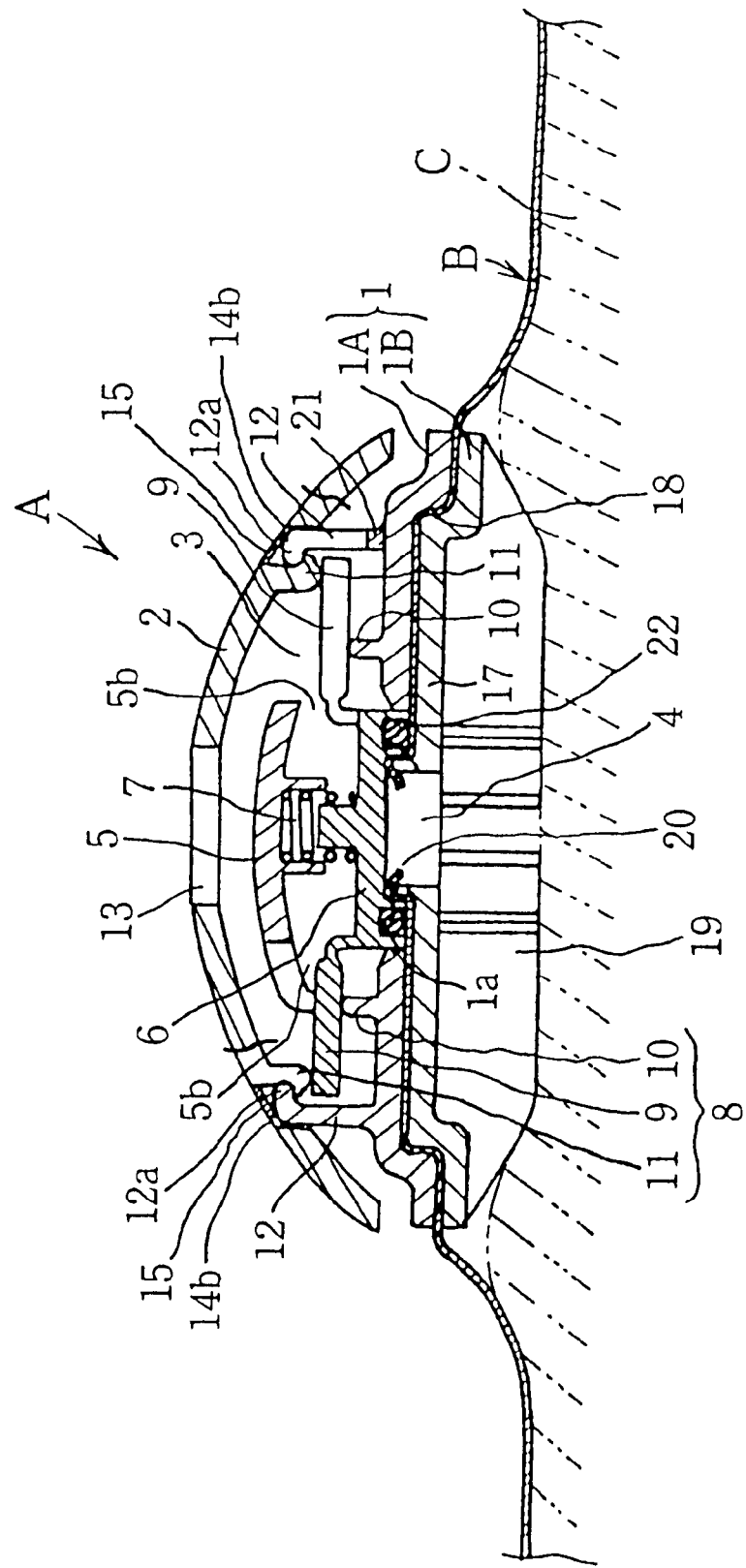
FIG. 1 is a vertical sectional view taken along lines X-Y of FIG. 2 showing a state of attachment of a bag, according to the present invention.
Figure 2:
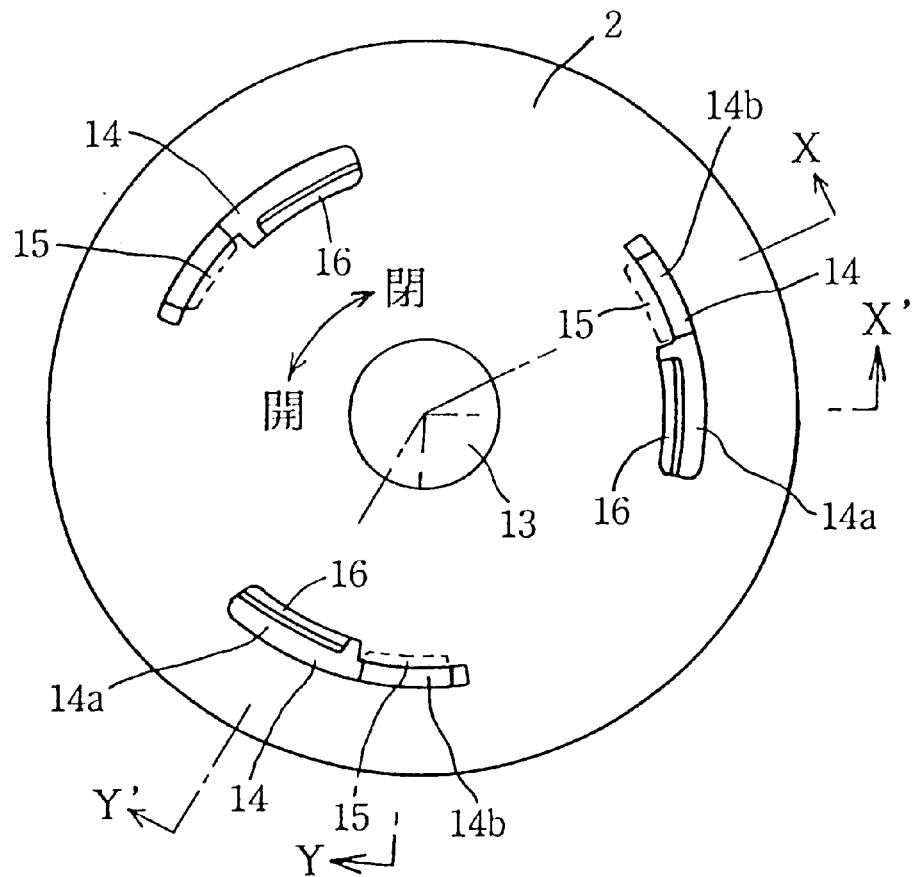
FIG. 2 is a plan view of the exhaust valve according to the present invention.
Figure 3:
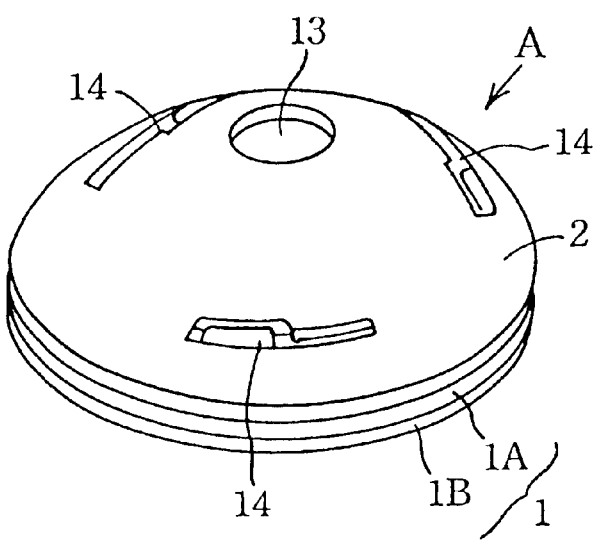
FIG. 3 is a perspective view of the exhaust valve shown in FIG. 2.

Now, embodiments of the present invention will be described hereinafter on the basis of drawings. In FIGS. 1 to 5, an exhaust valve (A) of the bag (B) which is made of synthetic resin comprises a valve body 1 and a movable lid 2 mounted to the valve body 1 to be movable in an up-and-down direction. A gap between a surface of the valve body 1 and a surface of the movable lid 2 facing to each other forms a vacuum-exhaust chamber 3.

The valve body 1 comprises a disc-shaped upper half part 1A and a lower half part 1B, which are separably laid one on the other. An exhaust opening portion 4 is provided at a center of the lower half part 1B to be communicated into the bag, while an opening portion for valve arrangement 1a, whose diameter is larger than that of the exhaust opening portion 4, is provided at a center of the upper half part 1A so as to be communicated with the exhaust opening portion 4. A spring holder 5 is arranged above the exhaust opening portion 4 at a height leaving a small interval upwards from the exhaust opening portion 4. Further, leg members 5a, 5a, 5a are mounted to be integrated with the spring holder 5 at several positions (three positions in the drawing) of a periphery thereof in a downward direction. The spring holder 5 is fixed at a predetermined length from the upper surface of the valve body, by integrating each of lower ends of the leg members 5a, 5a, 5a with an upper surface of the valve body 1 at a part surrounding the opening portion for valve arrangement 1a, namely with an upper surface of the upper half part 1A.

An upper end of the above-mentioned exhaust opening portion 4 is closed by a disc-shaped valve plate 6, whose diameter is larger than the exhaust opening portion 4, so as to be able to be opened and closed via the opening portion for valve arrangement 1a. A spring 7 is held between an upper surface of the valve plate 6 and a lower surface of the spring holder 5 in a state of being compressed. Under a normal condition, the exhaust opening portion 4 is closed by having the valve plate 6 pressed against and kept into contact with the exhaust opening portion 4 by a spring force of the spring 7.

Furthermore, an opening portion 5b is provided between the adjacent leg members 5a, 5a of the above-mentioned leg members 5a, 5a, 5a, which opening portion 5b opens horizontally toward the inside of the peripheral portion of the vacuum-exhaust chamber 3, and is communicated with the vacuum-exhaust chamber 3. A valve plate operational mechanism 8 is arranged via the opening portion 5b.

The valve plate operational mechanism 8 comprises lever members 9, fulcrum members 10, and pressing projecting strips 11. The lever members 9 radially project one from each of several positions (3 positions in the drawing) of the periphery of the valve plate 6 toward the periphery of the vacuum-exhaust chamber 3. Each of the fulcrum members 10 receives a middle of a length of a lower surface of the lever member 9. Each of the pressing projecting strips 11 is arranged at a periphery of the lower surface of the movable lid 2 so as to project downwardly. Each of the lever members 9 is connected to the peripheral end of the valve plate 6 with its inner end so as to be integrated therewith, and its outer end extends outwardly from the opening portion 5b to reach a periphery of the vacuum-exhaust chamber 3. Further, each of the above-mentioned fulcrum members 10 project from an upper surface of the valve body 1 near each of the leg members 5a of the spring holder 5. When the movable lid 2 is moved down and a force of pressing down is applied onto the upper surfaces of the outer ends of the lever members 9, which upper surfaces are located outside the fulcrum members 10, each inner end of the lever members 9 is moved upward, having the upper surface of the fulcrum member 10 as a fulcrum, together with the valve plate 6 against the force of the spring 7, and the valve is opened. When the force of pressing down is released, the lever members 9 are moved in a reverse direction by the force of the spring 7 and the valve is automatically closed.

Furthermore, a ring-shaped projecting wall 21, surrounding surfaces of outer ends of the lever members 9, is mounted to project at a peripheral part of the upper surface of the valve body 1. A projecting guide portion 12 is mounted to project upward at each of positions of the projecting wall 21 where the guide member 12 faces each of the outer ends of the lever members 9. An engaging projection 12a is mounted to be integrated with an upper end of the projecting guide portion 12 in a manner that the engaging projection 12a projects inward so that lower surface thereof faces an upper surface of the outer end of the lever member 9 leaving a small interval between the former and the latter.

In the meantime, the above-mentioned movable lid 2 is formed to be a domed-shape, which has the same diameter with the valve body 1 and has a gentle arc-like convex inclination from a center part to a periphery thereof. A whole upper surface of the domed-shape is formed to be a smooth surface having no protuberances or the like. An air intake 13 going through from an upper surface to a lower surface of the movable lid 2 is provided at a center of the domed-shape. An upper surface of the spring holder 5 is arranged below a lower end of an opening portion of the air intake 13 leaving a predetermined interval between the former and the latter.

Further, arc-shaped opening portions 14,14,14 going through from the upper surface to the lower surface of the movable lid 2 are provided at a peripheral part of the movable lid 2 and along an imaginary circle whose center is the same as that of the movable lid 2. One of the arc-shaped opening portions 14 faces each projecting guide portion 12 which is mounted to project from several positions of a surface of a peripheral part of the above-mentioned valve body 1. The projecting guide portion 12 is inserted into each corresponding arc-shaped opening portion 14 in a manner that the projecting guide portion can be movable comparatively to the movable lid 2 by turning the movable lid 2 in a direction along the periphery of the movable lid 2.

A half of the above-mentioned arc-shaped opening portion 14 is formed to be an opening portion 14a in which the projecting guide portion 12 is comparatively movable in an up-and-down direction. At an upper end of an opening portion 14b, being the other half of the arc-shaped opening portion 14, a stopper 15, which receives an upper surface of the projecting guide portion 12, is mounted to project toward the opening portion 14b. A lower surface of the engaging projection 12a of the projecting guide portion 12 is engaged with an inner periphery of the opening portion 14a of the above-mentioned half of the arc-shaped opening portion so that the movable lid 2 is prevented from moving up further by a restoring force of the spring 7. An engaging projecting segment 16 is provided to project from the inner periphery of the opening portion 14a so that the movable lid 2 is prevented from leaving the valve body 1 in an upward direction. In the meantime, a word saying pen is printed on the side of the opening portion 14a located on one side of the opening portion 14, and a word lose is printed on the side of the opening portion 14b on the other side of the opening portion 14. The opening portion 14b is provided with the stopper 15. Further, each of the outward engaging projections 11a, which is formed at a lower end of the pressing projecting strip 11 of the movable lid 2 may also be structured so as to be engaged with each of inward engaging projections 12a of the projecting guide portion 12 so that it can be prevented that the movable lid 2 is prevented from moving up further.

A lower surface of the upper half part 1A of the valve body 1 provides a circular-shaped concave portion 18, into which a disc portion 17 is removably inserted, said disc portion being integrated with the upper surface of the lower half part 1B. Further, a lower surface of the lower half part 1B is provided with partition plates 19 with a predetermined height, which partition plates 19 radially project from a peripheral part surrounding the exhaust opening portion 4, in order to avoid a direct contact of the exhaust opening portion 4 with the contents of the bag B.

Figure 4:
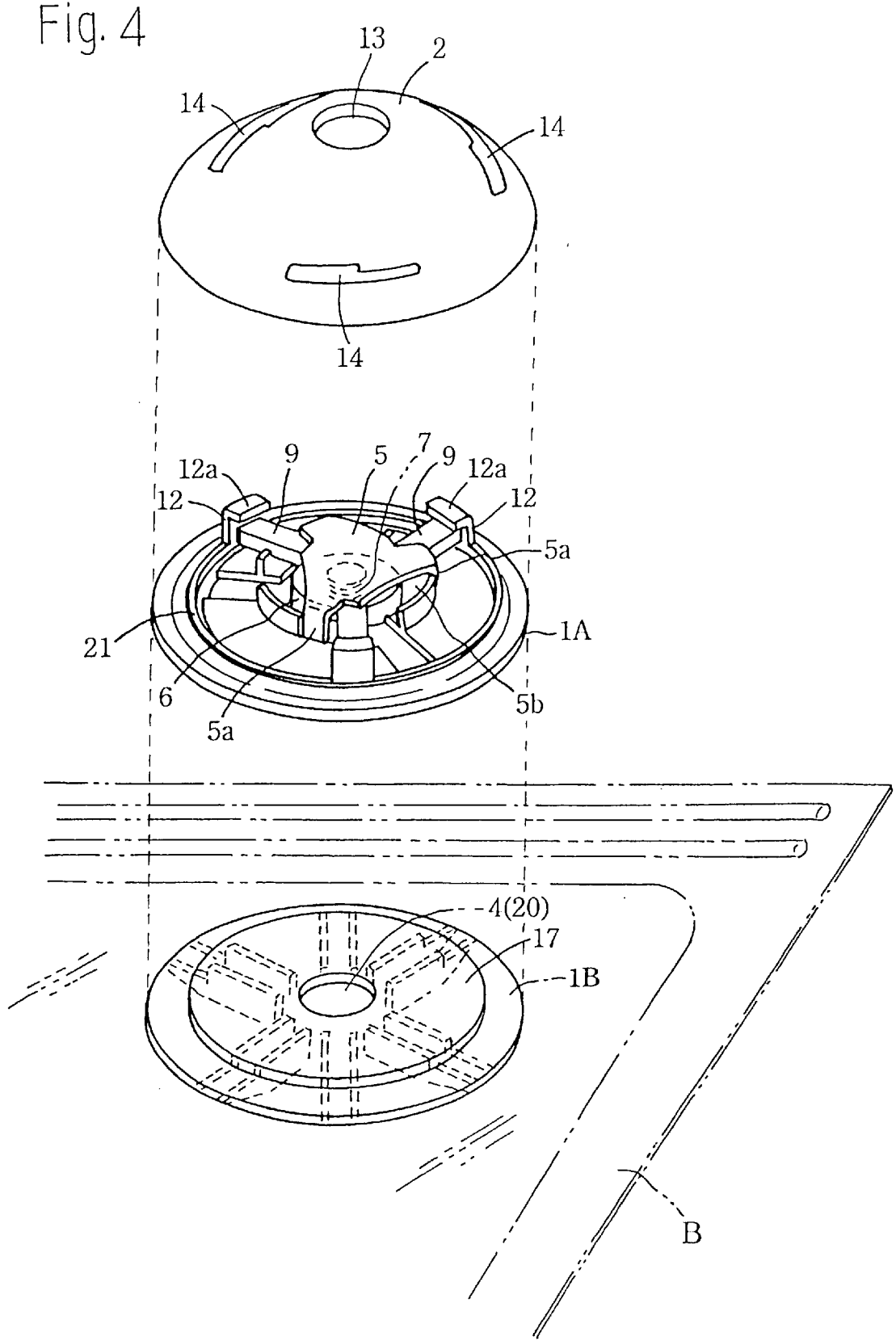
FIG. 4 is a disassembled perspective view of the exhaust valve according to the present invention.
Figure 5:
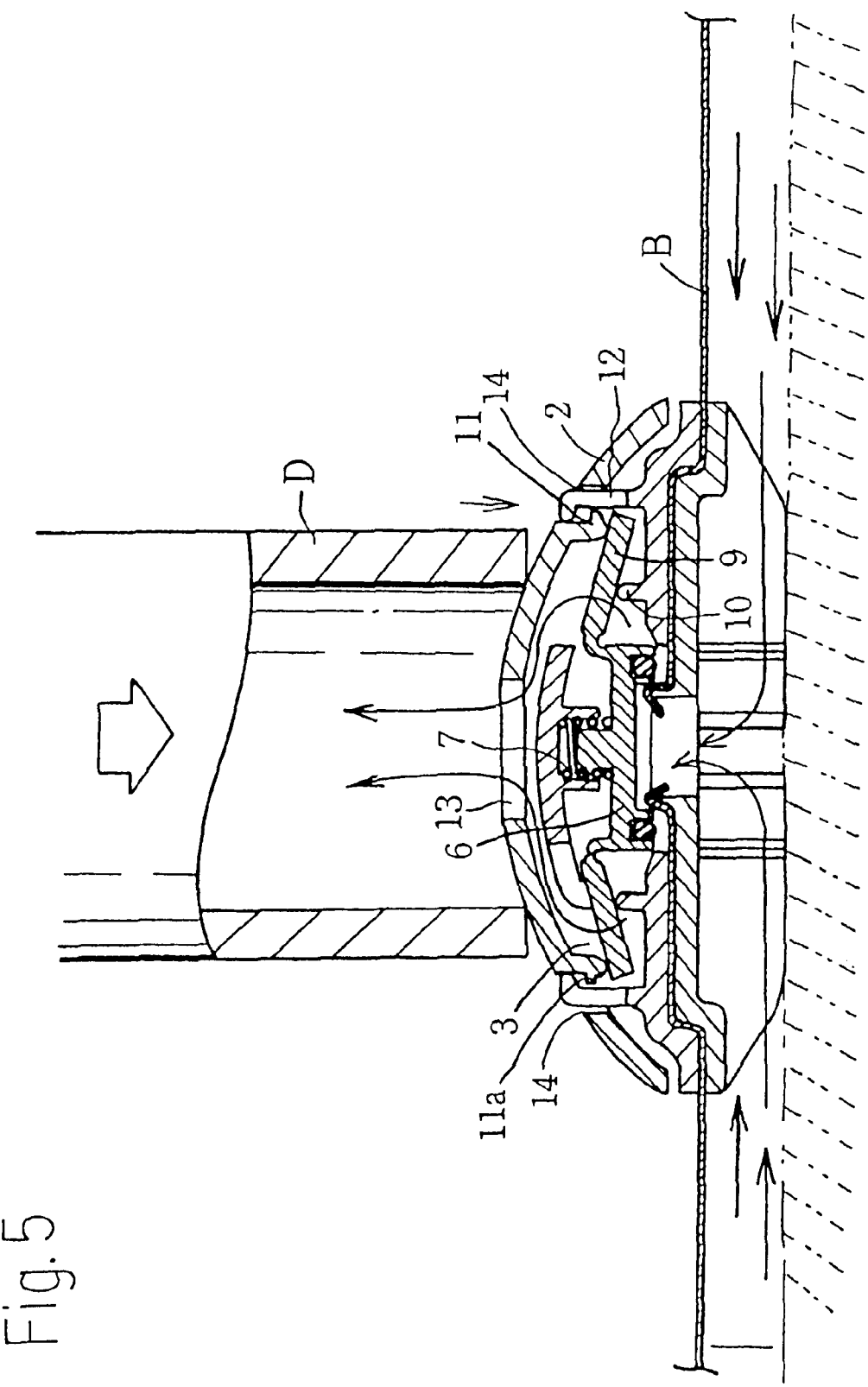
FIG. 5 is a view similar to FIG. 2, showing a state of deareration, according to the present invention.

As shown in FIGS. 4 and 5, in order to mount the exhaust valve (A), being structured in a manner as mentioned above, to a flat and rectangular-shaped synthetic resin bag (B), which is formed with a flexible synthetic resin sheet, the lower half part 1B of the valve body 1 of the exhaust valve A is fit to an inner surface of the bag in a manner that the exhaust opening portion 4 can be communicated with a small opening portion 20 provided at a proper position of one side of the bag (B). Then, by pressing the upper half part 1A of the valve body 1 against the lower half part 1B from an outer surface of the bag (B), a circular-shaped concave section 18 of the upper half part 1A and a disc portion 17 of the lower half part 1B are engaged with each other so that the former and the latter are coupled to each other holding a part surrounding the small opening portion 20 in-between, and the valve body 1 is mounted to the bag (B).

In the above-mentioned case, a diameter of the above-mentioned small opening portion 20 provided in the bag (B) is made to be smaller than that of the exhaust opening portion 4 which is provided in the lower half part 1B of the valve body 1. Accordingly, a part surrounding the small opening portion 20 is exposed within the large opening portion for valve arrangement 1a, whose diameter is larger than that of the exhaust opening portion 4 provided in the upper half part 1A of the valve body 1, and is laid on an upper periphery of the exhaust opening portion 4. Accordingly, a packing 22 mounted from the opening portion for valve arrangement 1a to the lower peripheral part of the valve plate 6 is in contact, under pressure, with the exposed part surrounding the small opening portion 20, whereby leak of the air and invasion of the outside air can be prevented.

In order to have contents (C) of the bag (B) compressed by using the bag (B) provided with the exhaust valve (A), at first, the contents (C) such as a comforter or the like are put in the bag (B) from an opening portion thereof, and the bag is hermetically sealed by engaging a fastener from one end to the other end of the bag (B), which fastener comprises a convex strip and a concave strip each of which being provided along each of opening ends of inner surfaces, which faces to each other, of the bag (B).

Figure 6:
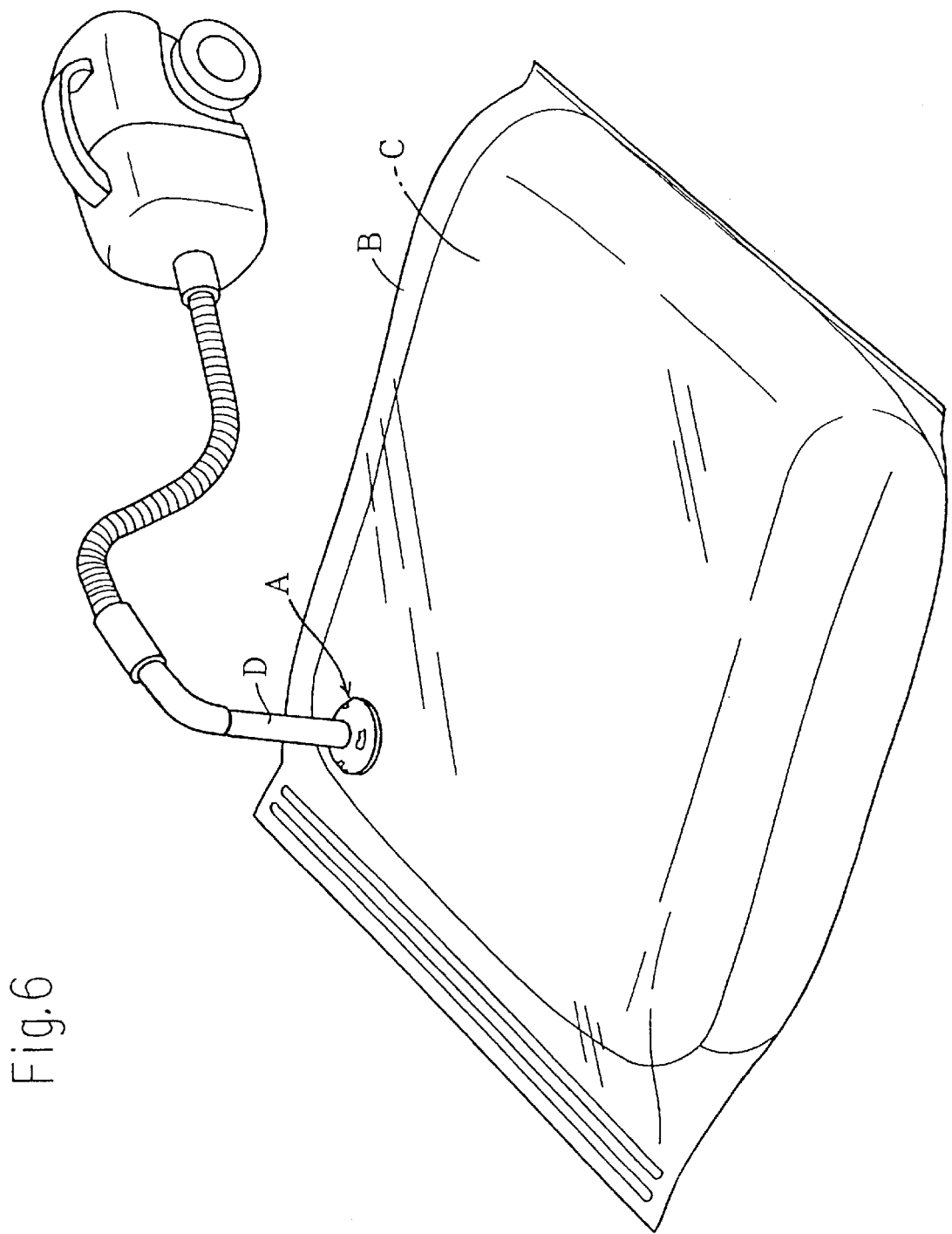
FIG. 6 is a perspective view of the exhaust valve at the time of deaeration, according to the present invention.
Figure 7:
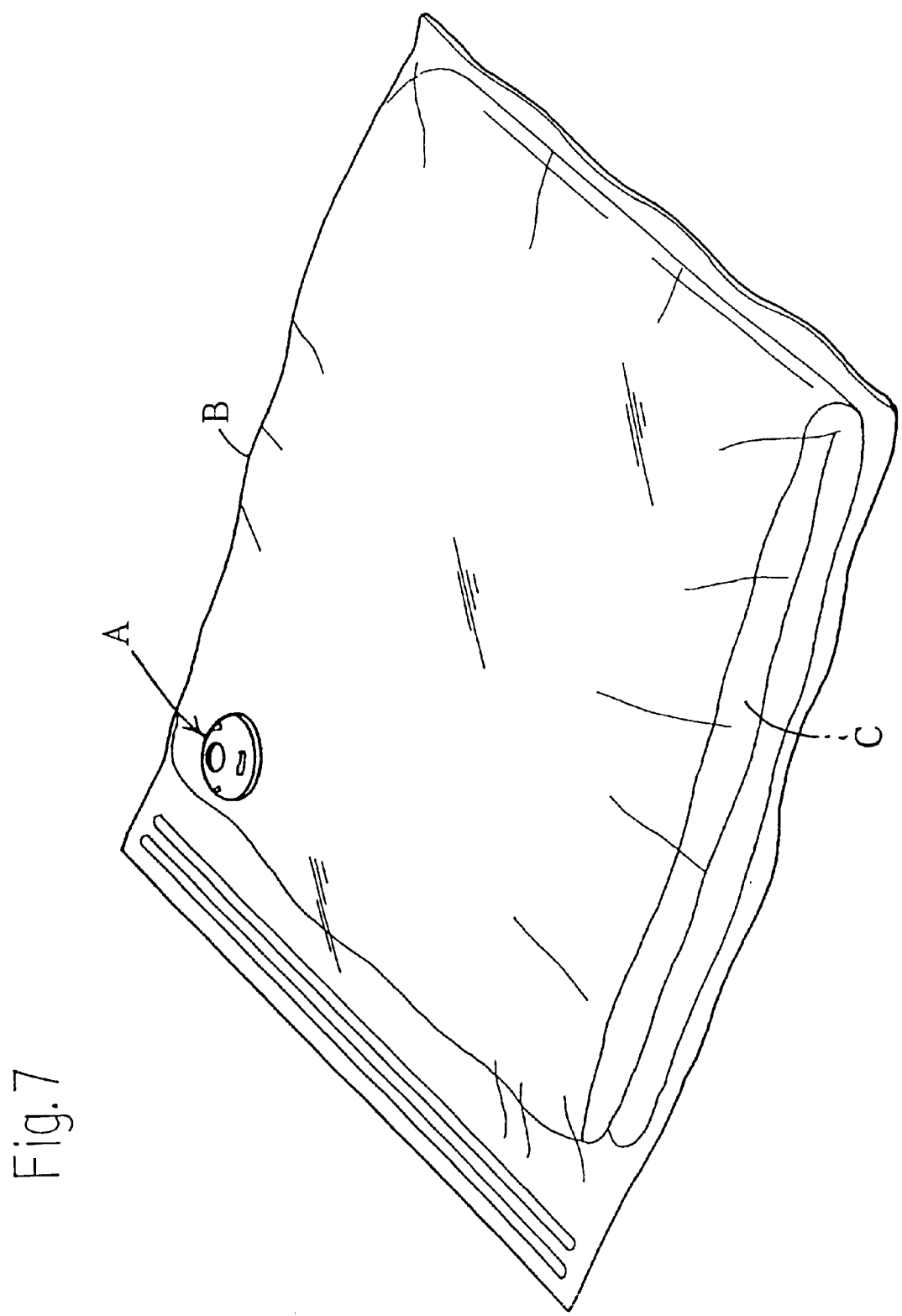
FIG. 7 is a perspective view of the exhaust valve showing the deaerated bag, according to the present invention.

Next, as shown in FIGS. 5 and 6, a suction nozzle (D) of an electric vacuum cleaner is brought into contact with an upper surface of the movable lid 2 of the exhaust valve A so that an air intake 13 can be communicated with the suction nozzle (D). At this time, the movable lid 2 is so turned that projecting guide portions 12 on a side of the valve body 1 can be positioned movably in an up-and-down direction at opening portions 14a located at a position of pen Under the above-mentioned situation, when the suction nozzle (D) is pressed toward the valve body 1, the movable lid 2 is moved down toward the valve body 1 and an upper surfaces of outer ends of the lever members 9 are pressed by the pressing projecting strip 11 projecting beneath the movable lid 2 presses, and then each of the lever members 9 moves the outer end thereof downwardly and the inner end thereof upwardly with a fulcrum member 10 as a fulcrum. Further, as the inner end of each of the lever members 9 is connected to be integrated with a periphery of the valve plate 6, the valve plate 6 is pressed upwardly against a force of the spring 7 by an upward movement of the inner end of each of the lever members 9, and the valve plate 6 leaves the exhaust opening portion 4, making the valve open.

When the electric vacuum cleaner is operated while keeping the valve open in a manner as mentioned above, a suction force of the suction nozzle (D) works within the pump chamber 3 through the air intake 13 of the movable lid 2, and further works from the vacuum-exhaust chamber 3 to the bag (B) through the exhaust opening portion 4, whereby the air in the bag (B) is suctioned and exhausted by the suction nozzle (D) from the exhaust opening portion 4 through the vacuum-exhaust chamber 3 and the air intake 13, and the contents (C) such as the comforter or the like are compressed to be made flat.

During an operation of deaeration of the bag (B), the suction force of the suction nozzle (D) also works on the arc-shaped opening portions 14 on a side of the movable lid 2, which arc-shaped opening portions 14 are communicated with an inside of the vacuum-exhaust chamber 3, through the inside of the vacuum-exhaust chamber 3, and the outside air, together with the air inside the bag (B), is drawn from the arc-shaped opening portions 14 into the suction nozzle (D) through the vacuum exhaust chamber 3 and the air intake 13. As the outside air continues to be drawn from the arc-shaped opening portions 14 after the bag is completely deaerated, the bag can be deaerated while applying an overload to a motor of the electric vacuum cleaner.

When the bag (B) is deaerated and the contents (C) such as a comforter or the like become compressed, the pressing force of the suction nozzle (D) of the vacuum cleaner against the movable lid 2 is released. Then the valve plate 6 is moved down by a restoring force of the spring 7, whereby the exhaust opening portion 4 is automatically closed and the inner end of each of the lever members 9 is moved down, together with the valve plate 6, with the fulcrum member 10 as the fulcrum by the downward movement of the valve plate 6, while the outer end of each of the lever members 9 is moved up, being in contact with and pressing the pressing projecting strip 11 of the movable lid 2, so as to return to the original position together with the movable lid 2.

After the contents (C) are compressed by the deaeration of the bag (B) in a manner as mentioned above, by turning the movable lid 2 to the direction of lose to move the above-mentioned projecting guide portions 12 on the side of valve body 1 toward the side of the opening portions 14b of the arc-shaped opening portions 14, which is provided in the movable lid 2, surfaces of the upper ends of the projecting guide portions 12 come close to or come into contact with the lower surface of the stoppers 15, which project to the opening portions 14b, and then the movable lid 2 is locked at a position of being moved up so as not to be moved down. Accordingly, even when the bag (B) is piled one on the other for storage, the movable lid 2, which is mounted to the bag (B) piled beneath another, is surely prevented from moving down by a weight of another bag (B) piled on the first bag (B).

Figure 8:
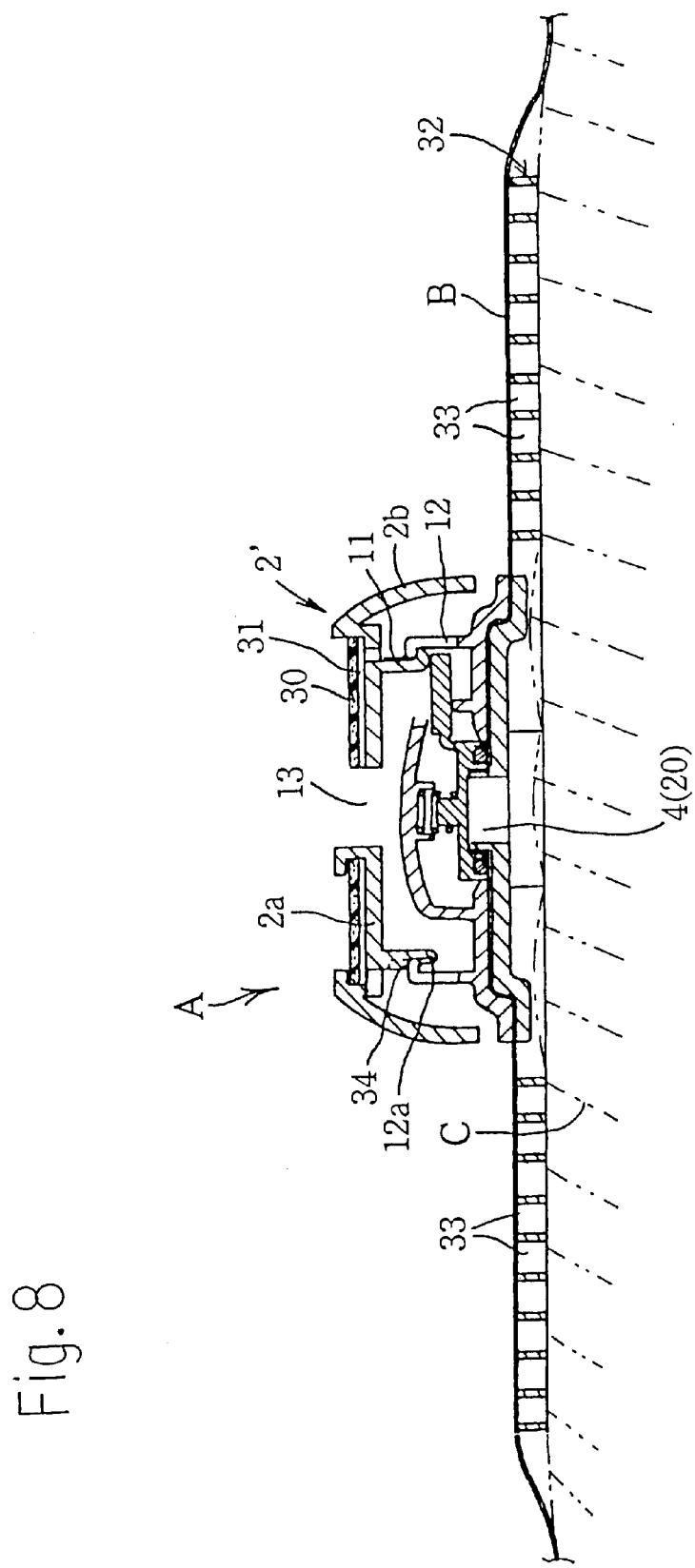
FIG. 8 is a vertical sectional view of the exhaust valve showing an alternative embodiment of the present invention.
Figure 9:
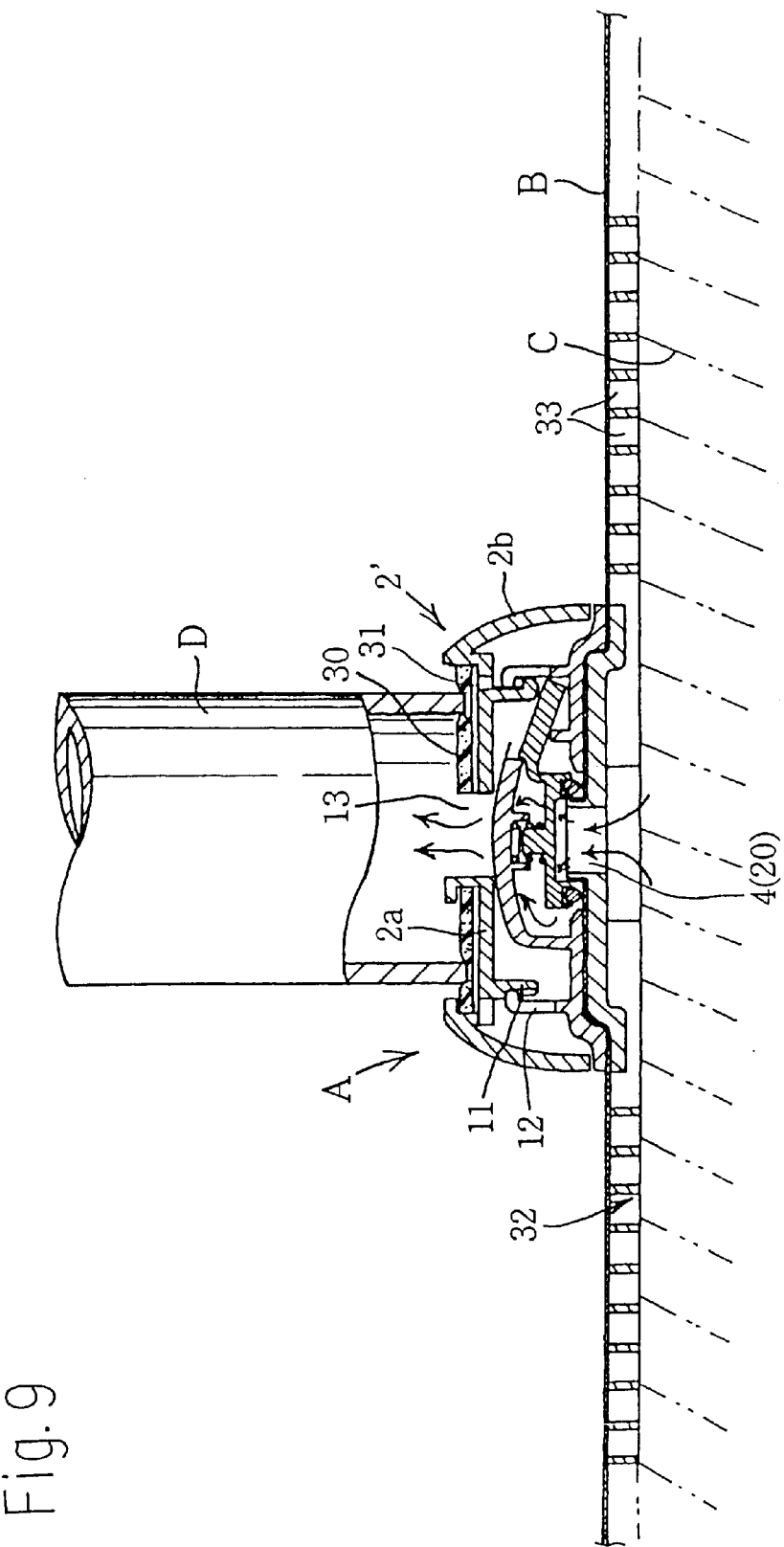
FIG. 9 is a view similar to FIG. 8 showing the valve used to evacuate a bag.
Figure 10:
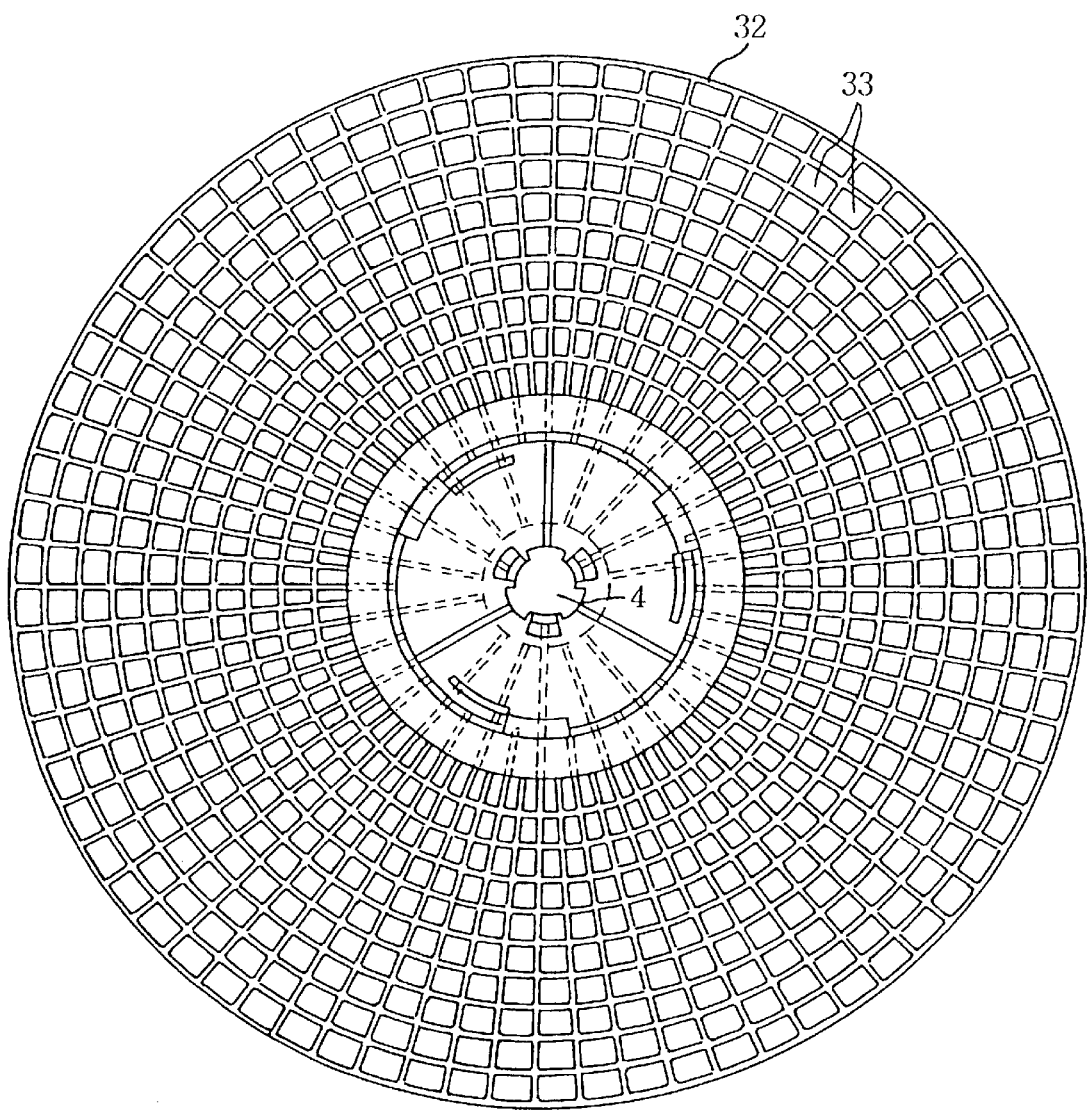
FIG. 10 is a bottom view of the exhaust valve according to another embodiment of the present invention.

FIGS. 8 to 10 show the other embodiment of the present invention. A movable lid 2 comprises a disc portion 2a, whose upper surface is flat, and a surrounding wall 2b, which surrounds and is integrated with the disc portion 2a, and curves downwardly from the disc portion 2a to form an arc shape. An air intake 13 is provided in a center of the disc portion 2a, and a sponge body 30 with a predetermined thickness is laid on an upper surface of the disc portion 2a surrounding the air intake 13. Further, a plural number of projecting strips 31, whose height is smaller than that of the thickness of the sponge body 30, are radially arranged to project from the surface of the disc portion 2a so that the projecting strips 31 can prevent the sponge body 30 from being compressed more than necessity requires when a vacuum nozzle (D) of an electric vacuum cleaner is pressed against the sponge body 30, as shown in FIG. 9, whereby the outside air is partly sucked through the sponge body 30 during deaeration, wherefore a bag (B) can be deaerated without applying an overload on a motor of the electric vacuum cleaner.

Further, a ring-shaped supporting frame 32, having a plurality of small opening portion 33 going from an upper surface through a lower surface of the supporting frame 32, is provided to be integrated with and to surround the lower half part 1B of the valve body 1. When the valve body 1 is mounted to the bag (B) by having a part surrounding an opening portion 20 of the bag (B) held between an upper half part 1A and the lower half part 1B as mentioned above, an upper surface of the supporting frame 32 comes into contact with an inner surface of the bag (B) and at the same time a lower surface of the supporting frame 32 suppress contents (C) so that filling material such as feathers, in case the contents (C) are a comforter filled with feathers, can be prevented from moving to an exhaust opening portion 4.

In the meantime, such constructions that a pressing projecting strip 11, which presses a lever member is provided on a lower surface of the disc portion 1a of the movable lid 2 and that projecting guide portions 12 are provided to project from a peripheral part of upper surface of the valve body 1 in an upward direction, are the same as the above-mentioned embodiment. However, in the present embodiment, it is so constructed that the pressing projecting strip 11 and the projecting guide portions 12 prevent the movable lid 2 from coming off, and when the movable lid 2 is turned an upper end surface of an engaging projections 12a of the projecting guide portions 12 are engaged with a downward step member 34 whereby the movable lid 2 is prevented from moving down after deaeration. As the other constructions of the embodiment are the same as the above-mentioned embodiment, detailed explanation is omitted by applying the same marks to the same parts.

The foregoing relates to preferred exemplary embodiments of the invention, it being understood that other variants and embodiments thereof are possible within the spirit and scope of the invention, the latter being defined by the appended claims.

We claim:

1. An exhaust valve for a bag comprising;
   a valve body provided with an exhaust opening portion at a center of a lower part thereof to be communicated with a bag,
   a movable lid provided with an air intake going through from an upper surface to a lower surface thereof; said movable lid being mounted on the valve body movably toward and away from the valve body,
   a valve plate for opening and closing the exhaust opening portion,
   spring means for pressing the valve plate to the closed position to fit the exhaust opening portion closely, and
   a valve plate operating mechanism for opening the valve plate by moving the valve plate toward the open position against a spring force of the spring means; said valve plate, spring means and valve plate operating mechanism being arranged in a chamber formed between the opposite surfaces of the movable lid and the valve body, wherein the valve plate operating mechanism is operated by pressing the movable lid down so as to open the valve plate whereby the air in the bag may be exhausted from the air intake.

2. An exhaust valve for a bag, as claimed in claim 1, wherein a plurality of leg members of a spring holder, which is arranged above the exhaust opening portion, are fixed on the upper surface of the valve body around a periphery of the exhaust opening portion and the spring means is held between the spring holder and the valve plate with each of the opening portions between the adjacent leg members of the spring holder communicating with the air intake of the movable lid.

3. An exhaust valve for a bag, as claimed in claim 1, wherein the valve operating mechanism comprises
   a plurality of lever members which are integral with the outer periphery of the valve plate at their inner ends and radially project outwardly between each of the leg members of the spring holder,
   fulcrum members projecting from the upper surface of the valve plate to receive the under surfaces of the middle of the length of the lever members in longitudinal direction thereof, and
   pressing projecting strips each projecting downwardly towards the under surface of the periphery of the movable lid so as to press the outer portion of the upper surface of the lever member which portion is located outside the fulcrum members.

4. An exhaust valve for a bag, as claimed in claim 2, wherein the valve operating mechanism comprises
   a plurality of lever members which are integral with the outer periphery of the valve plate at their inner ends and radially project outwardly between each of the leg members of the spring holder,
   fulcrum members projecting from the upper surfaces of the valve plate to receive the under surfaces of the middle of the length of the lever members in longitudinal direction thereof, and
   pressing projecting strips each projecting downwardly towards the under surface of the periphery of the movable lid so as to press the outer portion of the upper surface of the lever member which portion is located outside the fulcrum members.

5. An exhaust valve for a bag, as claimed in claim 1, further comprising;
   projecting guide members projecting at a periphery of the upper surface of the valve plate, and
   arc-shaped openings formed in and extending through the movable lid to face the projecting guide members so as to move the projecting guide members relative to the movable lid with rotation of the movable lid in the direction of the periphery thereof; and
   an end portion of each of the arc-shaped openings being formed to be an opening for inserting the projecting guide members to be movable in an up-and-down direction therein and the other end portion being formed to be an opening having a stopper for stopping the downward movement of the movable lid by receiving the upper end surface of the projecting guide member.

6. An exhaust valve for a bag, as claimed in claim 2, further comprising;
   projecting guide members projecting at a periphery of the upper surface of the valve plate, and
   arc-shaped openings formed in and extending through the movable lid to face the projecting guide members so as to move the projecting guide members relative to the movable lid with rotation of the movable lid in the direction of the periphery thereof; and
   an end portion of each of the arc-shaped openings being formed to be an opening for inserting the projecting guide members to be movable in an up-and-down direction therein and the other end portion being formed to be an opening having a stopper for stopping the downward movement of the movable lid by receiving the upper end surface of the projecting guide member.

7. An exhaust valve for a bag, as claimed in claim 3, further comprising;
   projecting guide members projecting at a periphery of the upper surface of the valve plate,
   arc-shaped openings formed in and projecting through the movable lid to face the projecting guide members so as to move the projecting guide members relative to the movable lid with rotation of the movable lid in the direction of the periphery thereof; and an end portion of each of the arc-shaped openings being formed to be an opening for inserting the projecting guide members to be movable in an up-and-down direction therein and the other end being formed to be an opening having a stopper for stopping the downward movement of the movable lid by receiving the upper end surface of the projecting guide member.

8. An exhaust valve for a bag, as claimed in claim 1, wherein the valve body comprises an upper half part and a lower half part which are separably connected to one another so as to attach the valve body to the bag by holding a part of the bag from the outer and inner surfaces thereof, the lower half part providing the exhaust opening portion at a center of the lower part, which opening portion is communicated with a small opening portion of the bag from the inside surface thereof, and the upper half part providing an opening portion for valve arrangement at a center of the upper half part so as to press and contact a packing, which is mounted to a lower peripheral part of the valve plate, with the upper surface of the periphery of the small opening portion of the bag.

9. An exhaust valve for a bag, as claimed in claim 2, wherein the valve body comprises an upper half part and a lower half part which are separably connected to one another so as to attach the valve body to the bag by holding a part of the bag from the outer and inner surfaces thereof, the lower half part providing the exhaust opening portion at a center of the lower part, which opening portion is communicated with a small opening portion of the bag from the inside surface thereof, and the upper half part providing an opening portion for valve arrangement at a center of the upper half part so as to press and contact a packing, which is mounted to a lower peripheral part of the valve plate, with the upper surface of the periphery of the small opening portion of the bag.

10. An exhaust valve for a bag, as claimed in claim 3, wherein the valve body comprises an upper half part and a lower half part which are separably connected to one another so as to attach the valve body to the bag by holding a part of the bag from the outer and inner surfaces thereof, the lower half part providing the exhaust opening portion at a center of the lower part, which opening portion is communicated with a small opening portion of the bag from the inside surface thereof, and the upper half part providing an opening portion for valve arrangement at a center of the upper half part so as to press and contact a packing, which is mounted to a lower peripheral part of the valve plate, with the upper surface of the periphery of the small opening portion of the bag.

11. An exhaust valve for a bag, a claimed in claim 1, wherein the movable lid is formed in a form of dome.

12. An exhaust valve for a bag, as claimed in claim 2, wherein the movable lid is formed in a form of dome.

13. An exhaust valve for a bag, as claimed in claim 3, wherein the movable lid is formed in a form of dome.

14. An exhaust valve for a bag, as claimed in claim 4, wherein the movable lid is formed in a form of dome.

15. An exhaust valve for a bag, as claimed in claim 1, wherein the movable lid is provided with a surrounding wall formed integrally with and extending downwardly at a peripheral portion of a disc portion whose upper surface is flat, said disc portion having an air intake at a center thereof, and a sponge body having a predetermined thickness extending around the air intake whereby an open end of a suction nozzle pressed against the sponge body will form a partial seal around the air intake.

16. An exhaust valve for a bag, as claimed in claim 2, wherein the movable lid is provided with a surrounding wall formed integrally with and extending downwardly at a peripheral portion of a disc portion whose upper surface is flat, said disc portion having an air intake at a center thereof, and a sponge body having a predetermined thickness extending around the air intake whereby an open end of a suction nozzle pressed against the sponge body will form a partial seal around the air intake.

17. An exhaust valve for a bag, as claimed in claim 3, wherein the movable lid is provided with a surrounding wall formed integrally with and extending downwardly at a peripheral portion of a disc portion whose upper surface is flat, said disc portion having an air intake at a center thereof, and a sponge body having a predetermined thickness extending around the air intake whereby an open end of a suction nozzle pressed against the sponge body will form a partial seal around the air intake.

18. An exhaust valve for a bag, as claimed in claim 8, further comprising a ring-shaped supporting frame provided with the lower half portion of the valve body, said frame having a plurality of small opening portion penetrating the upper and lower surfaces of the valve body.

* * * * *